Figure 1:
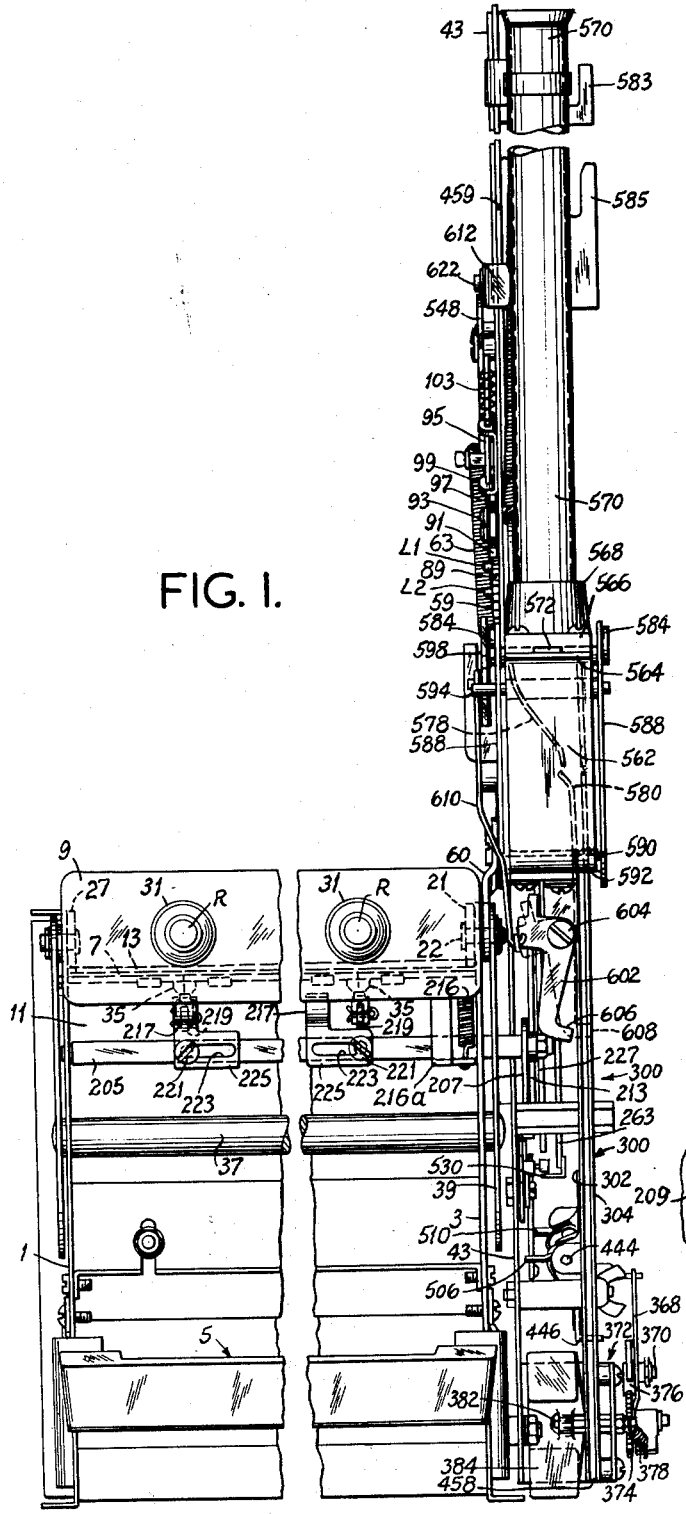

Feb. 18, 1964 A. W. HOLSTEIN ETAL 3,121,485
COIN HANDLING APPARATUS
Filed May 26, 1960 10 Sheets-Sheet 1

Alvin W. Holstein,
James T. Schuller,
Elmer S. Marr,
Inventors.
Koenig and Pope,
Attorneys.

Feb. 18, 1964    A. W. HOLSTEIN ETAL    3,121,485
COIN HANDLING APPARATUS
Filed May 26, 1960    10 Sheets-Sheet 2

Alvin W. Holstein,
James T. Schuller,
Elmer S. Marr,
Inventors.
Koenig and Pope,
Attorneys.

Feb. 18, 1964  A. W. HOLSTEIN ETAL  3,121,485
COIN HANDLING APPARATUS
Filed May 26, 1960  10 Sheets-Sheet 3

Alvin W. Holstein,
James T. Schuller,
Elmer S. Marr,
Inventors.
Koenig and Pope
Attorneys.

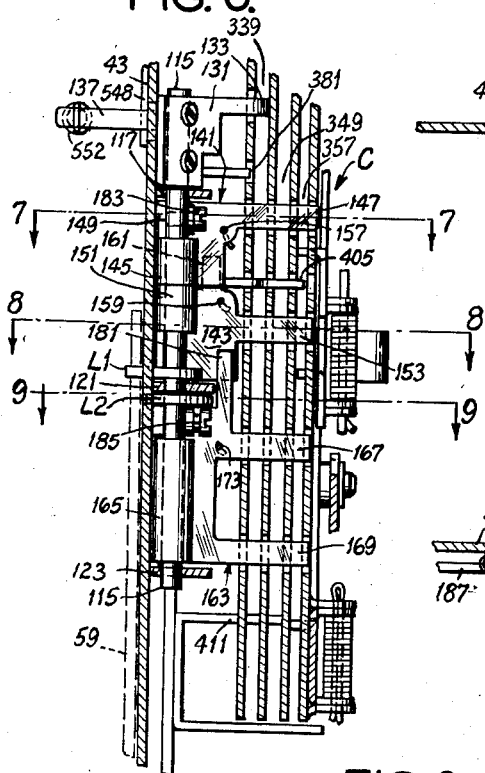
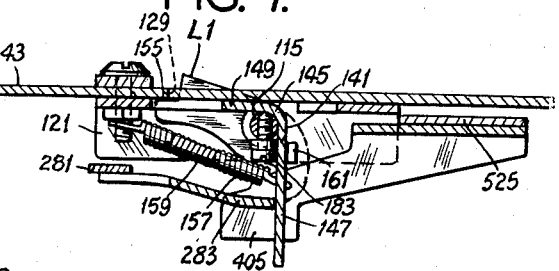
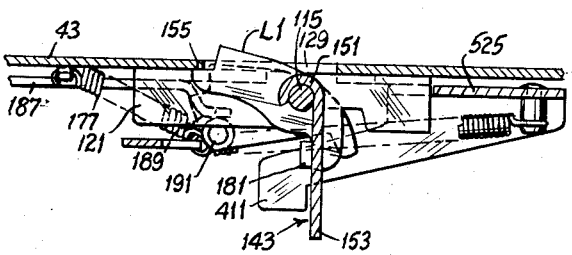
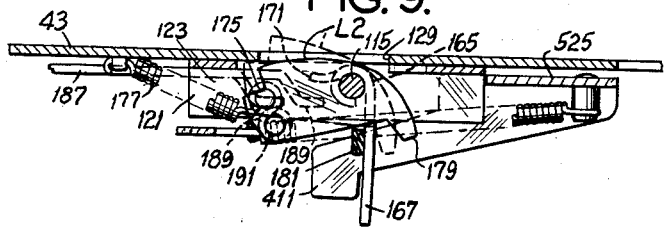
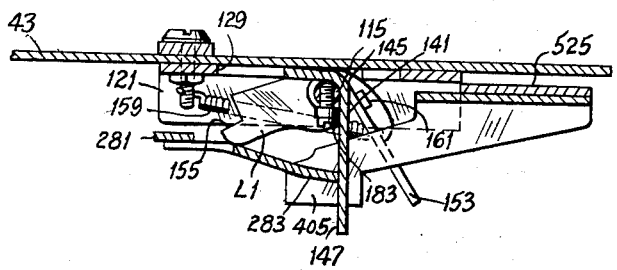

Feb. 18, 1964

A. W. HOLSTEIN ETAL 3,121,485

COIN HANDLING APPARATUS

Filed May 26, 1960

10 Sheets-Sheet 7

Alvin W. Holstein,
James T. Schuller,
Elmer S. Marr,
Inventors.
Koenig and Pope,
Attorneys.

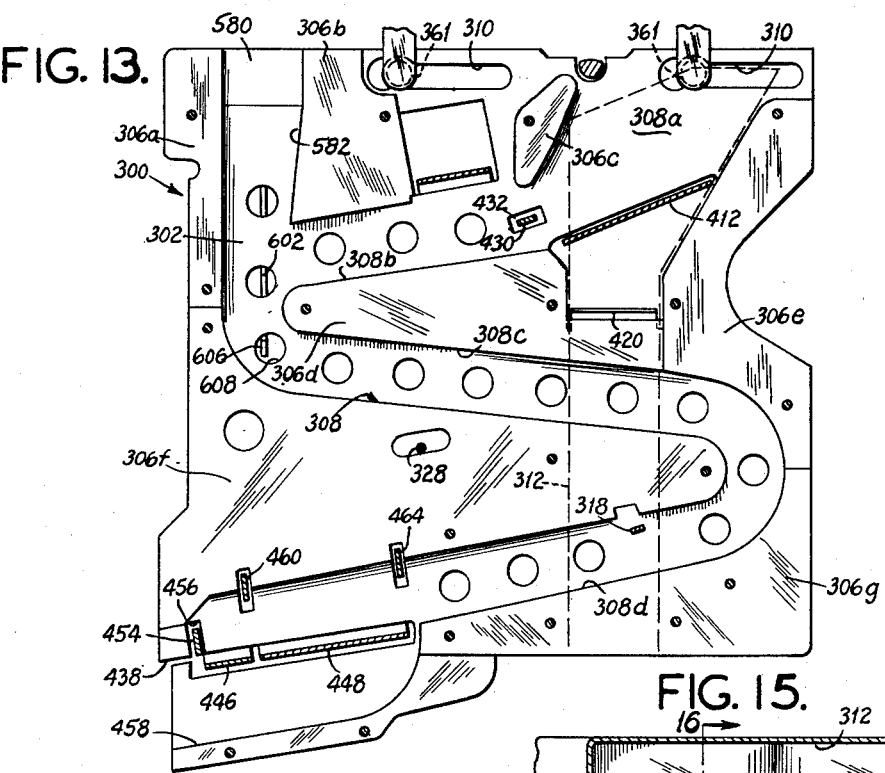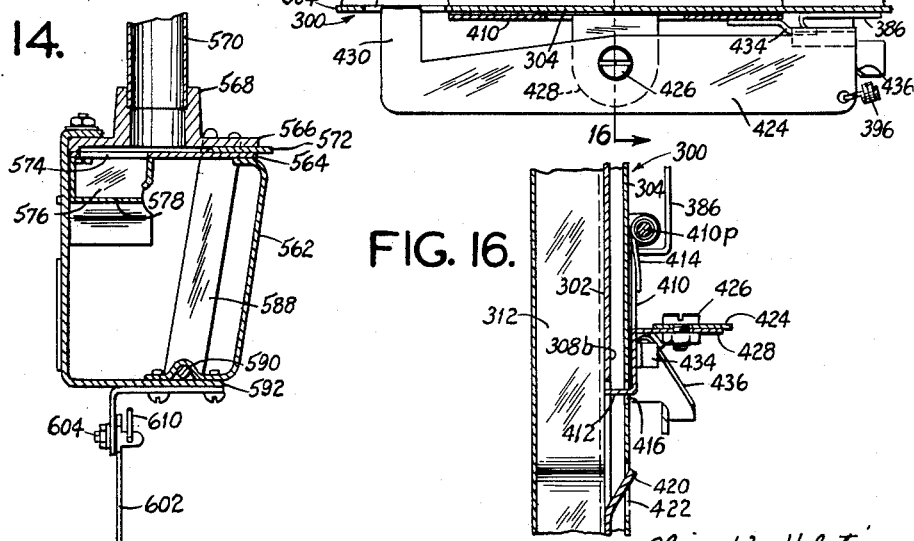

Feb. 18, 1964 A. W. HOLSTEIN ETAL 3,121,485
COIN HANDLING APPARATUS
Filed May 26, 1960 10 Sheets-Sheet 10

Alvin W. Holstein,
James T. Schuller,
Elmer S. Marr,
Inventors.
Koenig and Pope,
Attorneys.

United States Patent Office 3,121,485
Patented Feb. 18, 1964

3,121,485
COIN HANDLING APPARATUS
Alvin W. Holstein, Lemay, James T. Schuller, St. Ann's, and Elmer S. Marr, St. Louis, Mo., assignors, by mesne assignments, to Universal Match Corporation, Ferguson, Mo., a corporation of Delaware
Filed May 26, 1960, Ser. No. 31,906
9 Claims. (Cl. 194—2)

This invention relates to coin-handling apparatus and more particularly to change-making apparatus which is useful, for example, in vending machines.

In Fry United States Patent 2,858,921 issued November 4, 1958, there is shown a mechanical change-making apparatus for a vending machine which vends five-cent and ten-cent items, and which is adapted to dispense a nickel in change upon deposit in the machine of a dime and operation of the machine to obtain a five-cent item. One of the objects of this invention is the provision of a mechanical change-making apparatus for a machine such as is shown in this patent which extends the operation thereof to handle quarters as well as nickels and dimes, and which is adapted to dispense four nickels in change upon deposit of a quarter and operation of the machine to obtain a five-cent item and to dispense three nickels in change upon deposit of a quarter and operation of the machine to obtain a ten-cent item, as well as being adapted to dispense a nickel in change upon deposit of a dime and operation of the machine to obtain a five-cent item.

A further object of the invention is the provision of a change-making apparatus wherein the coins (nickels) which are to be dispensed in change are issued from a coin magazine which is adapted to be supplied with coins deposited in the machine by purchasers and which further includes means for replenishing the supply of coins in the coin magazine from a reserve supply in case more coins are dispensed in change than are deposited in the machine by purchasers and the supply in the coin magazine is depleted. In general, this is accomplished by providing means for detecting the level of coins in the coin magazine and means for dispensing a coin from the reserve supply upon each operation of the machine when the level of coins in the magazine is below a predetermined point and until the level is brought back up to this predetermined point.

A more specific object of the invention is the provision of a change-making apparatus such as described in which the coin magazine is of a type which holds a series of coins in edge-to-edge coplanar relation, and which may be referred to as the chute type of magazine, as distinguished from an upright tube type of magazine in which coins are stacked flatwise, and which may be referred to as the tube type magazine. While the tube type has the advantage of holding a maximum number of coins in a minimum of height, the chute type of magazine has certain advantages as regards the dispensing of different numbers of coins (one, three and four in this case). Accordingly, a specific features of this invention is that it utilizes a chute type of magazine for the coin magazine from which coins are dispensed in change, and a tube type of magazine for the reserve supply. Other objects and features will be in part apparent and in part pointed out hereinafter.

The invention accordingly comprises the constructions hereinafter described, the scope of the invention being indicated in the following claims.

Figure 24:
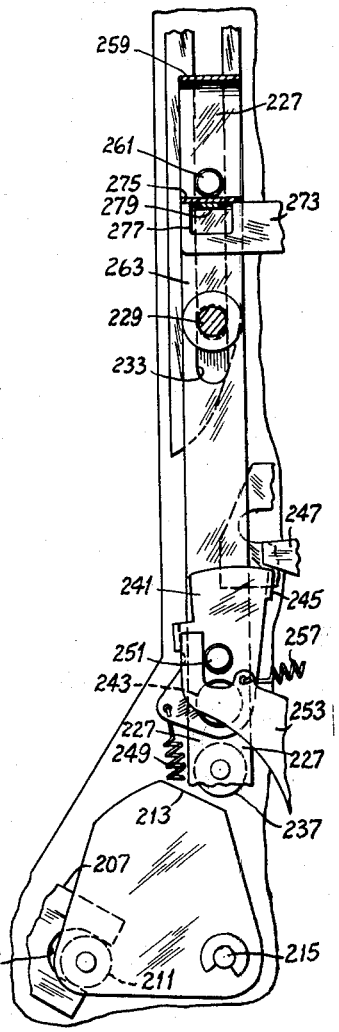
Figure 2:
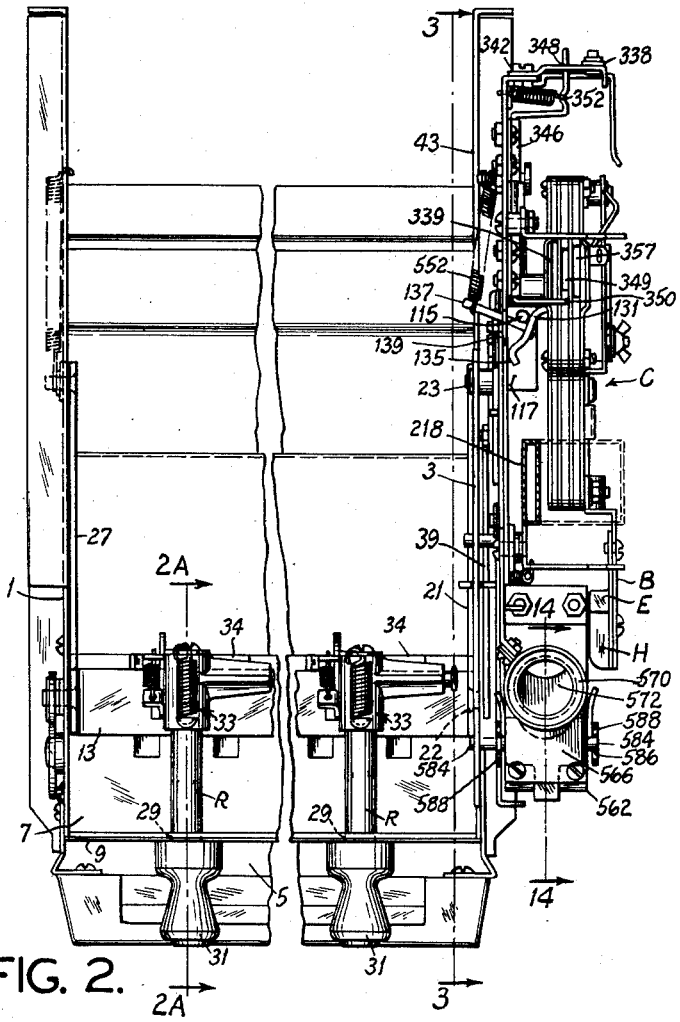
Figure 2A:
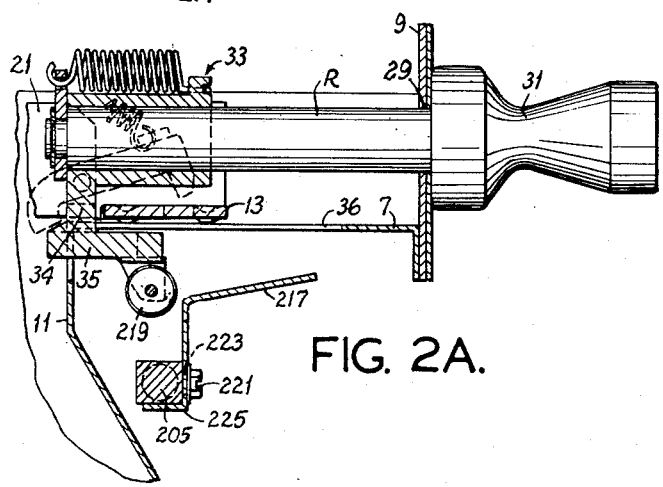
Figure 25:
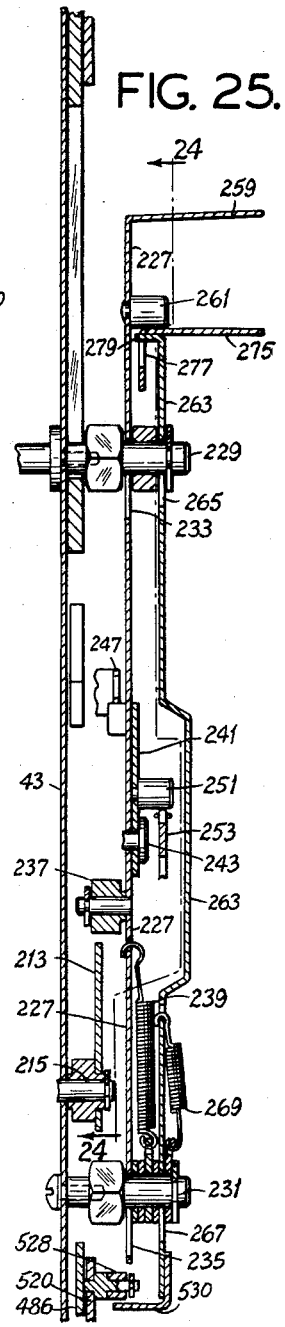
Figure 3:
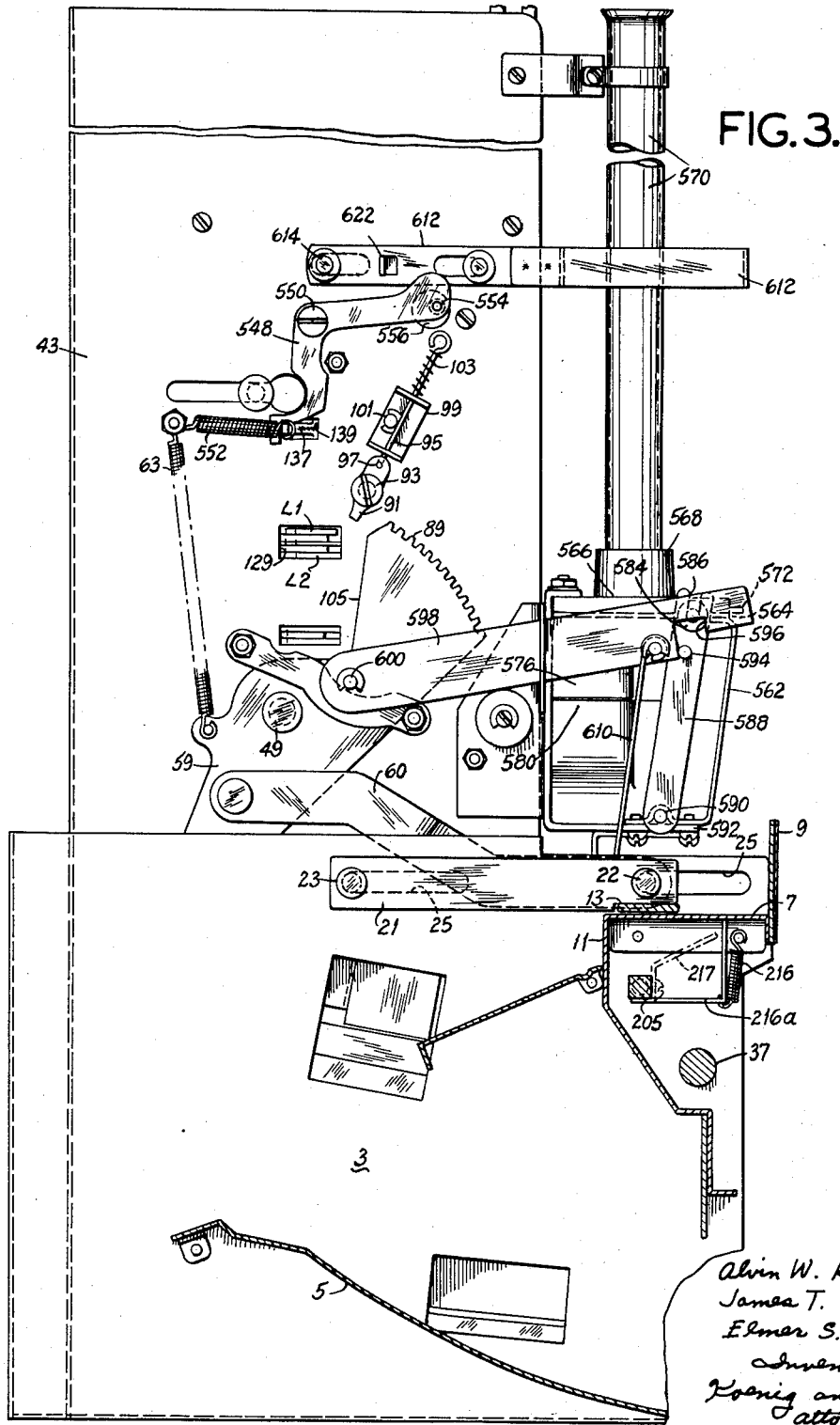
Figure 4:
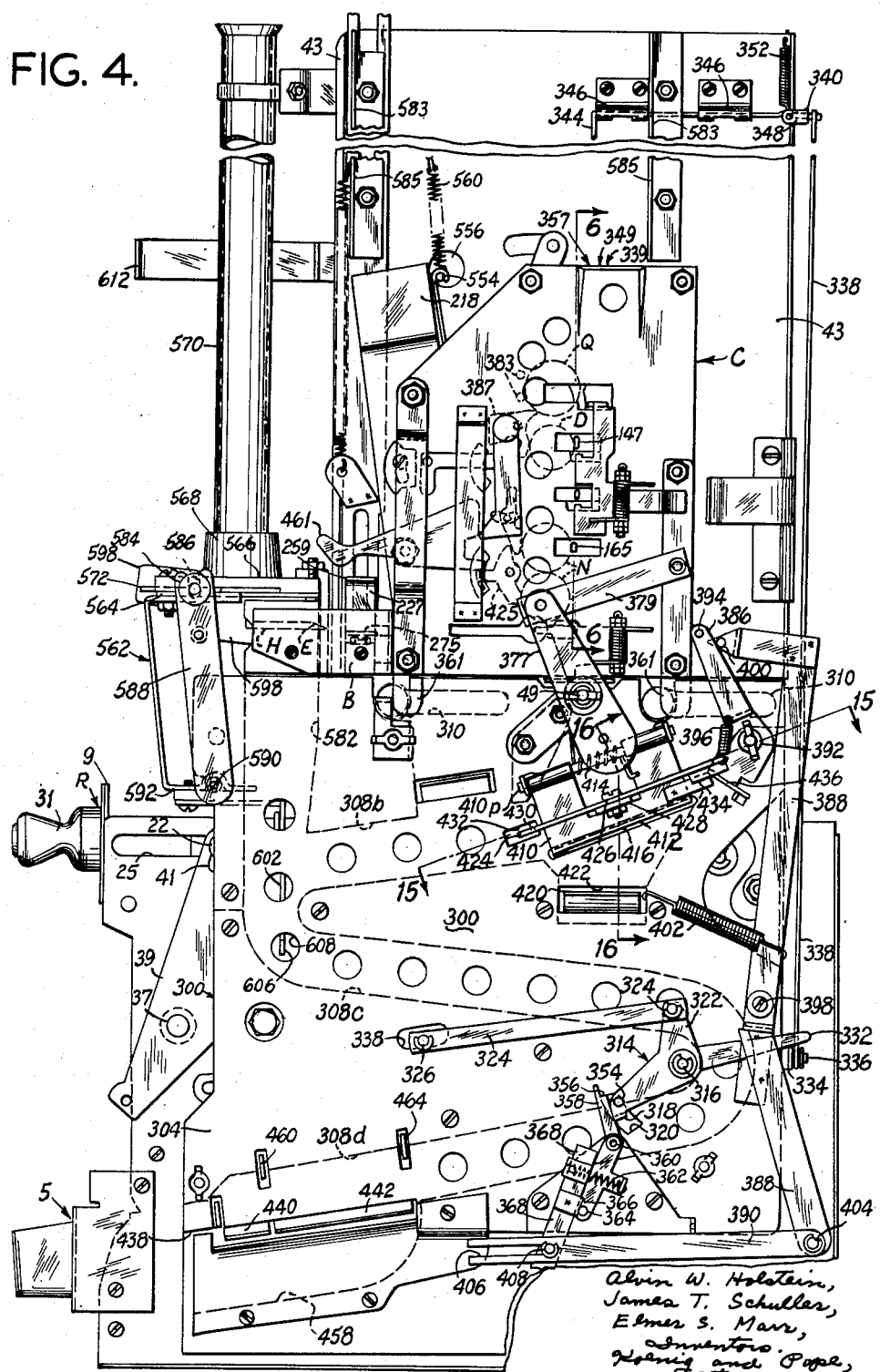
Figure 5:
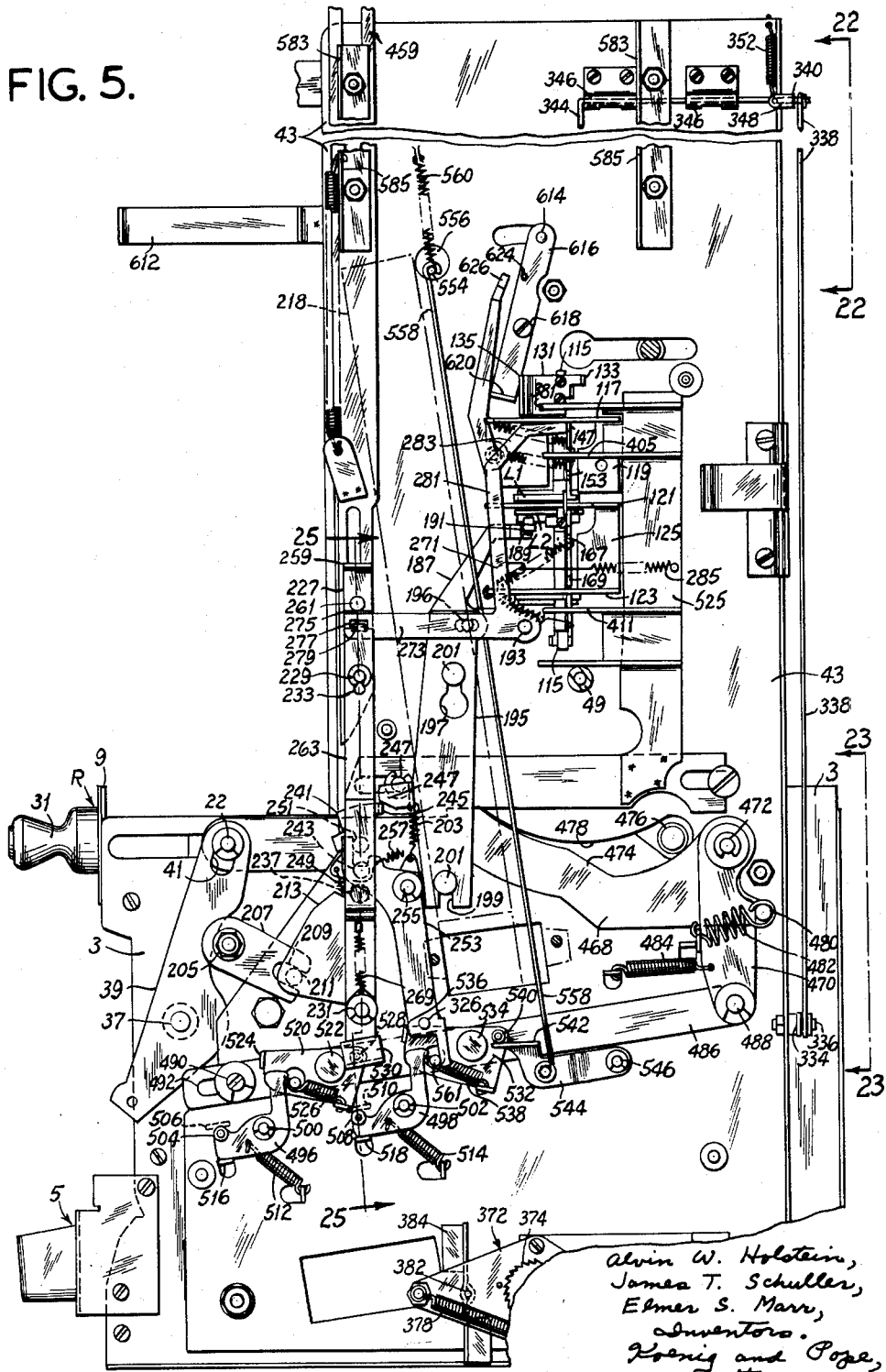
Figure 11:
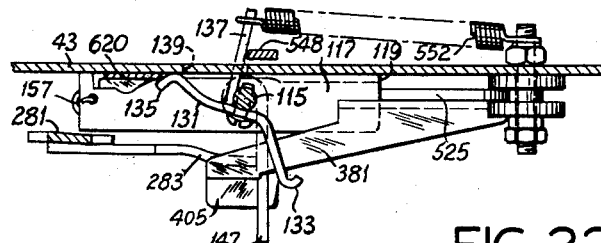
Figure 12:
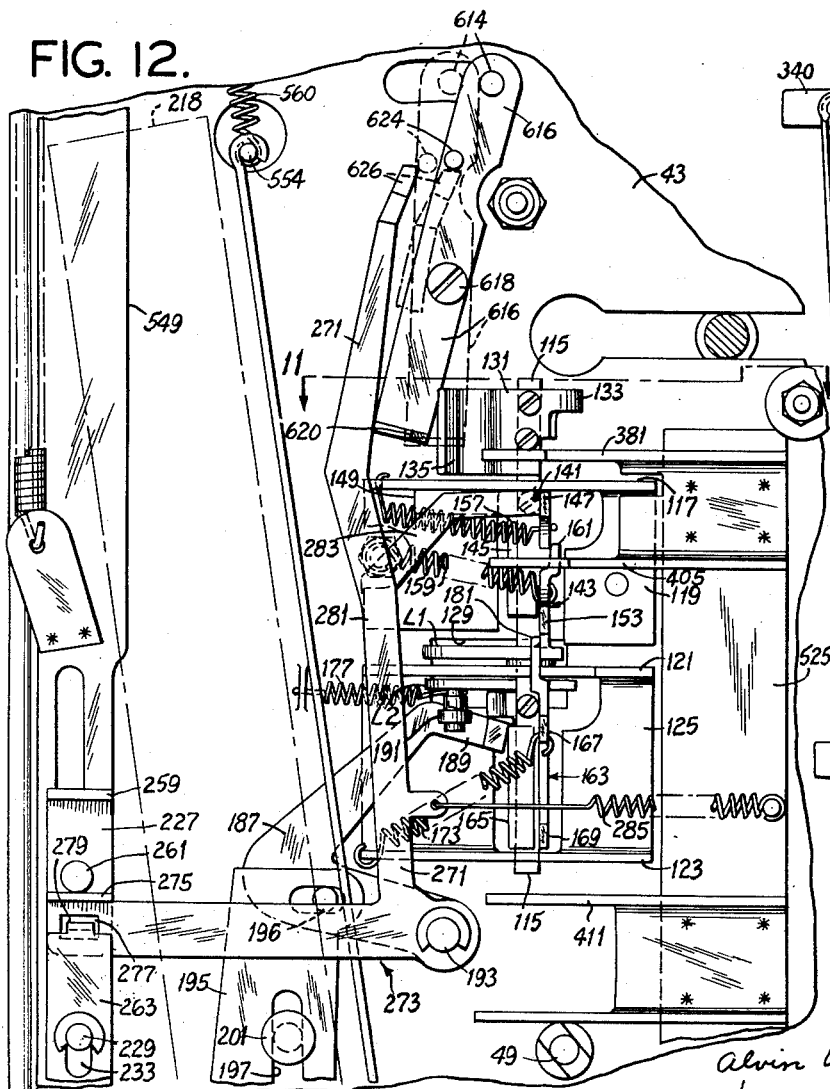
Figure 22:
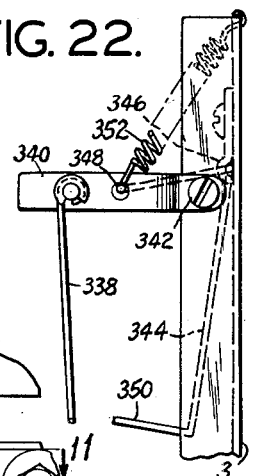
Figure 23:
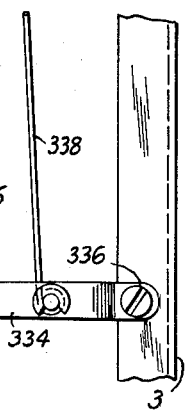
Figure 17:
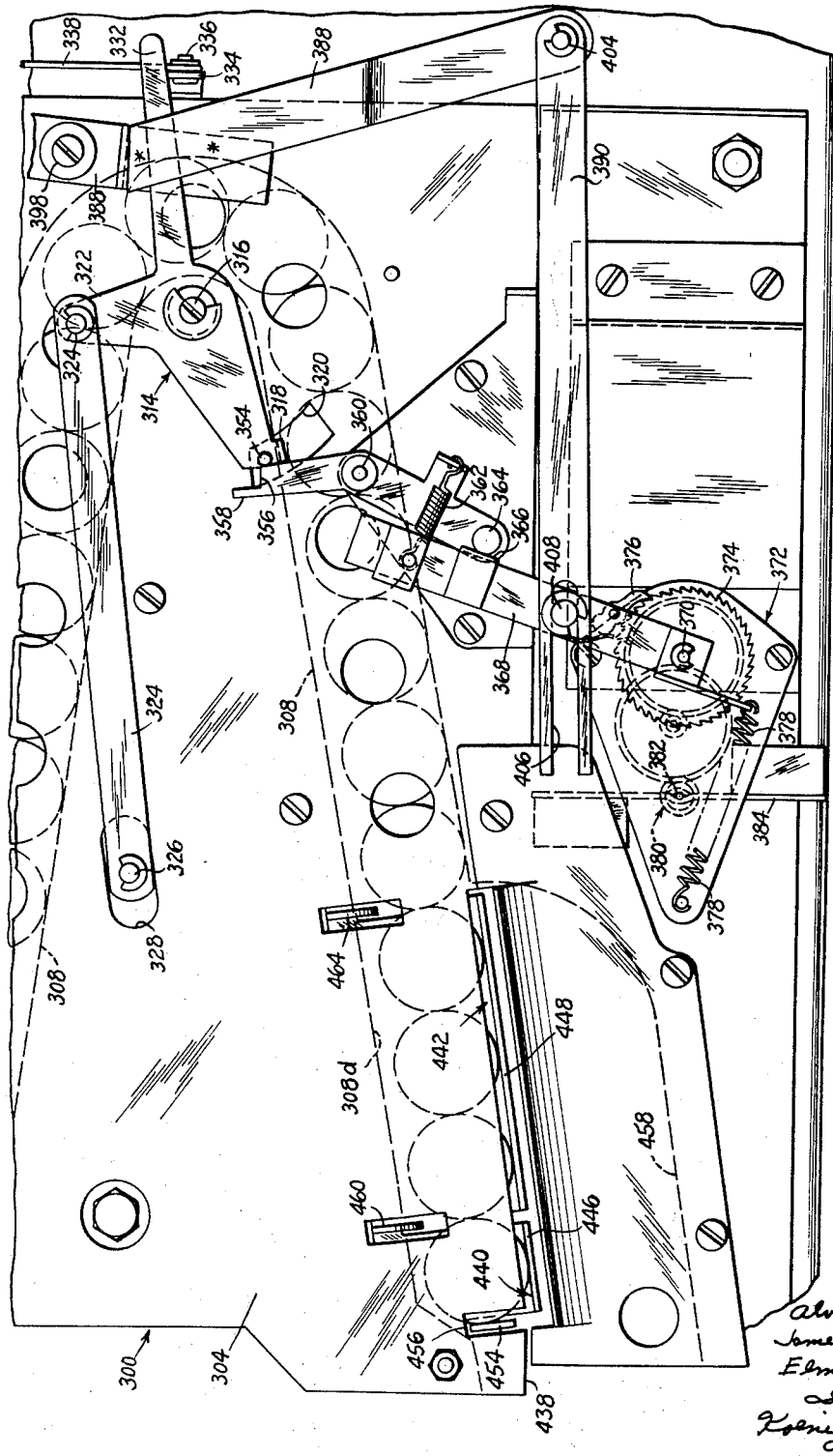
Figure 18:
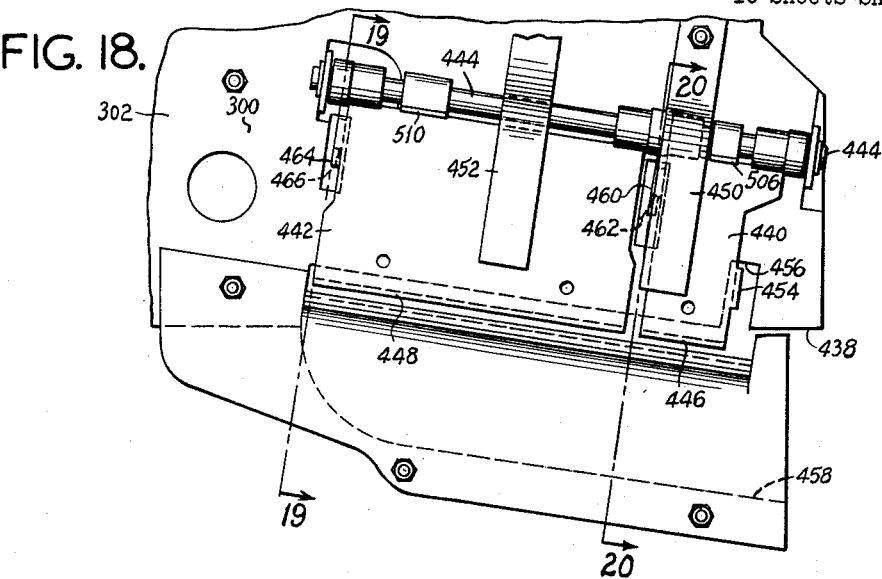
Figure 19:
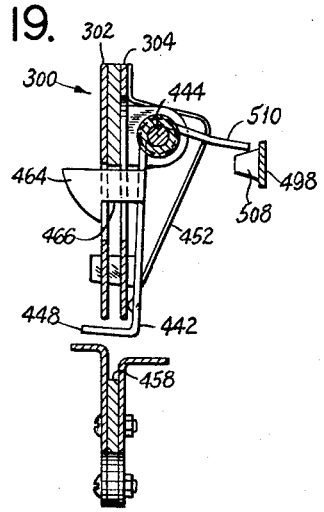
Figure 20:
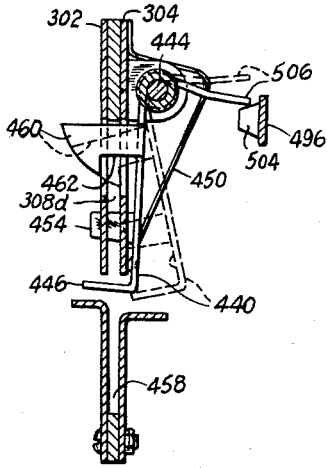
Figure 21:
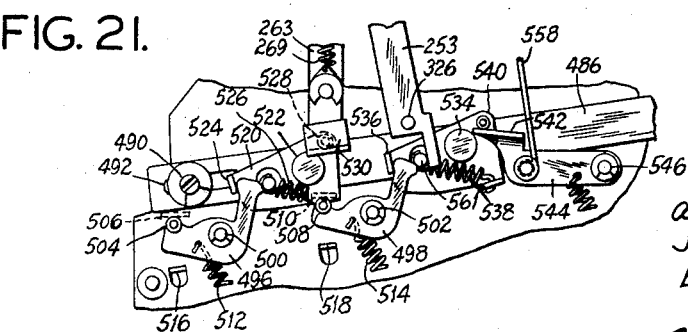

In the accompanying drawings, in which one of various possible embodiments of the invention is illustrated,
FIG. 1 is a front elevation of an apparatus constructed in accordance with this invention, partly broken away;
FIG. 2 is a plan view of FIG. 1, with a return chute broken away and shown in section;
FIG. 2A is an enlarged vertical section taken on line 2A—2A of FIG. 2;
FIG. 3 is a vertical section taken on line 3—3 of FIG. 2;
FIG. 4 is an elevation of the right side of FIG. 1, with parts broken away;
FIG. 5 is a view similar to FIG. 4 with certain parts removed;
FIG. 6 is a vertical cross section taken on line 6—6 of FIG. 4;
FIG. 7 is a horizontal section taken on line 7—7 of FIG. 6;
FIG. 8 is a horizontal section taken on line 8—8 of FIG. 6;
FIG. 9 is a horizontal section taken on line 9—9 of FIG. 6, showing in dotted lines a moved position of parts;
FIG. 10 is a view similar to FIG. 7 showing a moved position of parts;
FIG. 11 is an enlarged horizontal section taken on line 11—11 of FIG. 12;
FIG. 12 is an enlarged fragment of FIG. 5 showing a moved position of parts;
FIG. 13 is a view in elevation of a primary nickel magazine, with an outside plate thereof removed, and showing certain parts in section;
FIG. 14 is a vertical section taken on line 14—14 of FIG. 2;
FIG. 15 is an enlarged section taken on line 15—15 of FIG. 4;
FIG. 16 is a section taken on line 16—16 of FIG. 15;
FIG. 17 is an enlarged view of the lower part of FIG. 4;
FIG. 18 is a fragmentary view showing the inside of the lower end of the primary nickel magazine;
FIGS. 19 and 20 are sections taken on lines 19—19 and 20—20, respectively, of FIG. 18;
FIG. 21 is a fragment of FIG. 5 showing parts in moved positions;
FIG. 22 (Sheet 7) is a fragmentary elevation taken on line 22—22 of FIG. 5;
FIG. 23 (Sheet 7) is a fragmentary elevation taken on line 23—23 of FIG. 5;
FIG. 24 (Sheet 1) is a vertical section taken on line 24—24 of FIG. 25; and,
FIG. 25 (Sheet 2) is an enlarged vertical section taken on line 25—25 of FIG. 5.

Corresponding reference characters indicate corresponding parts throughout the several views of the drawings.

The invention is herein disclosed as it relates to a vending machine such as shown in the above-mentioned Fry patent having a plurality of magazines arranged side-by-side some of which may hold items selling for five cents and others of which may hold items selling for ten cents. Associated with each magazine is a dispensing mechanism including a selector or pull-out rod which must be pulled out from a retracted position and then returned to retract position to dispense an item. The machine includes a coin mechanism adapted to receive United States nickels, dimes and quarters. Deposit of a nickel allows the purchase of a five-cent item only. Deposit of a dime allows the purchase of either a five-cent or ten-cent item, a nickel being returned in change on purchase of a five-cent item. Deposit of a quarter allows the purchase of either a five-cent or ten-cent item four nickels being returned in change in the former case and three nickels being returned in change in the latter case.

Referring to the drawings, first more particularly to FIGS. 1–3, a vending machine in which the invention is incorporated is shown to comprise left and right side walls 1 and 3. A plurality of magazines (not shown) are mounted between these walls. These magazines may be of the type shown in Holstein U.S. Patent 2,896,817, for example. For each magazine there is a selector or pull-out rod R. Two rods R are shown in FIGS. 1 and 2, but it will be understood that the apparatus will usually have more than two, but no less than two. A receiver 5 extends between the walls 1 and 3 at the bottom of the apparatus to receive an item dispensed from any one of the magazines. Extending between the side walls at the front of the apparatus above the receiver is a fixed horizontal plate 7. This plate 7 carries an upwardly extending front plate 9 and has a downwardly extending rear flange 11. On the plate 7 is a draw bar 13 which extends from one side wall to the other. The draw bar is slidable on plate 7 transversely with respect to its own length, and in forward and rearward direction with respect to the apparatus. Extending rearward from the right end of the draw bar 13 is a horizontal arm 21 (see FIG. 3) having forward and rearward studs 22 and 23 thereon slidable in horizontal slots 25 in the right side wall 3. There is a similar arm 27 for the left end of the draw bar.

The draw bar 13 is adapted to be moved from the rearward retracted position illustrated in FIGS. 2 and 3 toward the front of the apparatus (toward the front plate 9) by pulling out any one of the rods R. Each rod R extends through an opening 29 in the plate 9 and has a knob 31 on its outer end. Fixed on the inner end of each rod R is a head 33. Each head has a rearward end portion 34 engageable with the rearward edge of draw bar 13. Each head also has a web 35 extending down through a slot 36 in the plate 7 (see FIG. 2A). Lock-out means such as shown in the above-mentioned Fry patent is provided to prevent pulling out more than one rod R at a time.

A shaft 37 extends between the side walls 1 and 3 below plate 7 being journalled at its ends in opening in the side walls 1 and 3. Fixed on the shaft on the outside of the right side wall 3 is a lever 39 (FIGS. 4 and 5). This lever has a slot 41 receiving the stud 22. A main mechanism plate 43 is secured to the right side wall 3 and extends up above the top of wall 3. A shaft 49 is journalled in the plate 43. Fixed on this shaft on the inside of main plate 43 is a control lever 59 (FIG. 3). A link 60 connects stud 22 to the control lever 59 below shaft 49. A tension spring 63 biases the lever 59 to turn clockwise as viewed in FIG. 3. This biases the draw bar 13 rearward, thereby normally holding the draw bar and all the rods R in the rearward retracted position illustrated in FIGS. 2 and 3 wherein the knobs engage the front plate 9.

When all the rods R are in retracted position, and when the draw bar 13 hence is in its rearward retracted position, the lever 59 occupies the retracted position illustrated in FIG. 3. The upper end of the lever 59 is formed with ratchet teeth as indicated at 89. At 91 is shown a latching pawl for the lever pivoted on the inside of main plate 43 by means of a stud 93. The pawl is normally held in the position shown in FIG. 3 by an overcentering spring mechanism including a rod 95 pivotally connected to the pawl at 97. The rod is slidable in a U-shaped bracket 99 pivoted on the inside of main plate 43 by a stud 101. A spring 103 biases the rod to move outward away from the pawl. The toothed end 89 of the lever comes into engagement with the pawl when the lever is swung counterclockwise from its retracted position as viewed in FIG. 3. This precludes return movement of the lever, unless the lever swings far enough for its toothed end 89 to move rearward clear of the pawl 91. This compels full-stroke operation of any rod R once it has been pulled out far enough for engagement of the teeth with the pawl. However, any rod R may be pulled out a short distance before the pawl engages the teeth.

The lever 59 has a shoulder 105 adapted, upon counterclockwise movement of the lever through a small angle from its retracted position illustrated in FIG. 3, for engagement with either of two coin-controlled latches L1 and L2 (see FIGS. 3 and 6). Latch L1 normally occupies an operative position in the path of the lever 59, but latch L2 normally occupies a retracted position out of the path of the lever 59. Each of the latches L1, L2 is rotary on a vertical rod 115 mounted on the outside of main plate 43 (see FIGS. 5–12). Rod 115 is itself mounted for rotation in openings in an upper horizontal flange 117 on an upper bracket 119 and in upper and lower horizontal flanges 121 and 123, respectively, on a lower bracket 125 on the outside of plate 43. Latches L1 and L2 in their operative position project through an opening 129 in the plate 43. When either latch is in its operative position, all the selector rods R are locked against being pulled out any more than a small distance corresponding to the small angle through which lever 59 may turn before its shoulder 105 engages either latch. This small movement of the lever is not sufficient for the toothed end 89 of the lever to latch onto the pawl 91. In order that any rod may be completely pulled out for full-stroke operation, it is necessary that both latches L1 and L2 be in their retracted position out of the path of the lever 59.

Rod 115 has a lever 131 (see FIGS. 5, 6, 11 and 12) secured to its upper end above the flange 117 of the upper bracket 119. Lever 131 has an arm 133 which, as will appear, is engageable by a quarter in a sliding coin chute assembly C (see FIGS. 2, 4 and 6) to rotate lever 131 and rod 115 counterclockwise as viewed from above away from a retracted position determined by engagement of edge portion 135 of the lever with the outside of main plate 43. Lever 131 also has an arm 137 which reaches through an opening 139 in plate 43 to the inside thereof.

Two levers 141 and 143 are pivoted on the portion of rod 115 between flanges 117 and 121, being rotatable relative to the rod and to one another. Lever 141, which is the upper of the two levers, has a hub portion 145 receiving rod 115, an arm 147 which, as will appear, is engageable by a dime in coin chute assembly C, and a stop arm 149 which is engageable with main plate 43 to determine a retracted position of lever 141. Lever 143 has a hub portion 151 receiving rod 115. Latch L1 (the upper of the two latches L1 and L2) is secured to the lower end of hub portion 151 of lever 143. Lever 143 also has an arm 153 similar to arm 147 of lever 141. Latch L1 comprises a horizontal plate which is notched to provide a shoulder 155 engageable with plate 43 at the front of opening 129 to limit clockwise swing of the latch L1 and lever 143 and to determine the operative position of latch L1 (see FIG. 7). A spring 157 (see FIGS. 7 and 12) biases lever 141 to its retracted position wherein its stop arm 149 engages wall 3. A spring 159 (see FIGS. 7 and 12) biases latch L1 to its operative position and lever 143 to a corresponding retracted position. Lever 143 has a finger 161 which extends upward in front of lever 141, the arrangement being such that when lever 141 swings counterclockwise away from its retracted position, its swings lever 143 counterclockwise away from its retracted position thereby to retract the latch L1. However, lever 143 and latch L1 may swing counterclockwise independently of lever 141.

Latch L2, which is also constituted by a horizontal plate like latch L1, is pivoted on rod 115 below flange 121 and above a lever 163 pivoted on rod 115. Lever 163 has a hub portion 165 receiving rod 115, upper and lower arms 167 and 169, and a stop arm 171. Lever 163 is biased by a spring 173 (see FIG. 12) to a retracted position determined by engagement of stop arm 171 with main plate 43. Latch L2 is notched to provide a shoulder 175 engageable with plate 43 at the front of opening 129, and is biased clockwise by a spring 177 toward its operative position projecting through opening 129, its clockwise swing being limited by engagement of shoulder 175 with plate 43. Latch L2 has a finger 179 engageable by finger 181 extending upward from lever 163 when the latter swings away from retracted position to retract the latch L2. Finger 181 also reaches up behind lever 143 for swinging the latter counterclockwise away from retracted position thereby to release latch L1 when lever 163 swings away from retracted position.

Screws 183 and 185 threaded in rod 115 are engageable with levers 141 and 163 to swing these levers away from retracted position (and also to swing lever 143 away from retracted position) when rod 115 is rotated counterclockwise away from its retracted position (toward which it is biased by springs 157, 159 and 173) and which is determined by engagement of edge portion 135 of lever 131 with plate 43.

Latch L2, while being biased toward operative position by spring 177, is normally held out of its operative position (its locking position) by a lever 187 having an end portion 189 formed as a cam engageable with a roller 191 on latch L2. Lever 187 is pivoted at 193 on the outside of main plate 43. A bar 195 mounted for vertical sliding movement on the outside of plate 43 has a pin and slot connection as indicated at 176 with the lever 187. Bar 195 has vertical slots 197 and 199 receiving studs 201 extending outward from the plate 43. It is biased downward by a spring 203 to a retracted position determined by engagement of the upper ends of the slots 197 and 199 with the studs 201. This determines a retracted position of lever 187 (see FIGS. 5 and 8) wherein cam 189 thereon holds latch L2 out of operative position. Upward movement of bar 195 results in clockwise swinging of lever 187 on pivot 193 (compare FIGS. 5 and 12) to release latch L2 to allow it to swing toward its operative position (see FIG. 9).

A rock shaft 205 is journalled at its ends in side walls 1 and 3 below the plate 7. This shaft is hereinafter referred to as the price shaft. Secured on the right end of price shaft 205 outside of main plate 43 is a crank arm 207. This crank arm has a slot 209 at its end receiving a roller 211 on a cam 213 which is pivoted at 215 on the outside of plate 43. The price shaft 205 is biased to rock counterclockwise as viewed in FIG. 3 and clockwise as viewed in FIG. 5 by a spring 216 (see FIG. 3) connected to an arm 216a on shaft 205. It is adapted to be rocked counterclockwise as viewed in FIG. 5 when any rod R for dispensing a five-cent item is pulled out. For this purpose, the price shaft carries arms 217 (see FIGS. 1 and 3) engageable by rollers 219 on heads 33 of the five-cent rods R. For convenience, an arm 217 is provided on the price shaft for every one of the rods R. As to those rods for dispensing ten-cent items, the respective arm 217 is positioned to lie out of the path of the respective roller 219. Thus, when a ten-cent rod is pulled out, price shaft 205 is not rocked. Arms 217 are attached to the price shaft by screws 221 threaded in tapped holes in the shaft and extending through slots 223 in base portions 225 of the arms 217 (see FIG. 1), allowing the arms to be shifted on the shaft either into or out of position for engagement by rollers 219. The stated arrangement makes it possible to utilize any rod R as either a five-cent rod or a ten-cent rod, as desired. FIG. 1 shows the left-hand rod R as a five-cent rod, meaning that its roller 219 is engageable with an arm 217 on the price shaft, and shows the right-hand rod R as a ten-cent rod, meaning that the respective arm 217 is set out of the path of the respective roller 219.

A bar 227 (see FIGS. 1, 2, 5, 12, 24 and 25) is mounted for vertical sliding movement on the outside of main plate 43 by means of upper and lower studs 229 and 231 extending through upper and lower elongate slots 233 and 235 in the bar. Bar 227 carries a follower roller 237 (see FIG. 24) for engagement by cam 213, and is biased downward by a spring 239. The arrangement is such that when price shaft 205 is rocked counterclockwise, cam 213 is rotated clockwise to drive the bar 227 upward. A dog 241 is pivoted at 243 on bar 227. Dog 241 has a finger 245 engageable in an operative position of the dog with an ear 247 on bar 195 to drive bar 195 upwardly when bar 227 moves upward. Dog 241 is biased toward a retracted position wherein finger 245 is clear of ear 247 by a spring 249. Dog 241 carries a pin 251. A lever 253 (see FIG. 5) pivoted at 255 on the outside of main plate 43 has its upper end portion engageable behind the pin 251 and is biased clockwise by a spring 257 to tend to hold the dog in operative position against the bias of spring 249. Thus, when bar 227 is driven upward, with dog 241 in operative position, bar 195 is driven upward to rock lever 187 clockwise, thereby to release latch L2 for movement toward its operative position. However, if dog 241 is in retracted position, upward movement of bar 227 is ineffective to release latch L2 for movement toward its operative position.

Bar 227 has an outwardly extending finger 259 at its upper end and, just below this, an outwardly extending pin 261. A second bar 263 is mounted for vertical sliding movement on the outside of bar 227, having slots 265 and 267 receiving the studs 233 and 235. Bar 263 is biased downward to a lowered retracted position by a spring 269. A lever 271 pivoted at 193 along with lever 187 has a forwardly extending arm 273 which reaches between bar 227 and the upper end of bar 263. Arm 273, at its forward end, has a finger 275 extending outward between the upper end of bar 263 and pin 261, and a hole 277 receiving a finger 279 at the upper end of bar 263. Lever 271 also has an upwardly extending arm 281 having a rearwardly directed finger 283 engageable with arm 147. Lever 271 is biased by a spring 285 to rock clockwise, but is normally held back in the retracted position in which it is shown in FIGS. 5 and 12 by engagement of finger 283 with arm 147 and by engagement of finger 275 with pin 261 on bar 227, the bias of spring 285 being insufficient to overcome the spring bias tending to hold arm 147 in its retracted position or the spring bias tending to hold bar 227 down. However, when bar 227 moves upward and when arm 147 swings counterclockwise as viewed from above from its retracted position, lever 271 may then swing clockwise from its retracted position of FIGS. 5 and 12. Hole 277 in bar 263 permits some lost motion of lever 271 relative to bar 263 (see FIGS. 12 and 25), finger 279 at the upper end of bar 263 normally being near the top of hole 277.

Arms 133, 147, 153, 167 and 169 normally extend laterally outward from side wall 3 in position for engagement by coins in the sliding coin chute assembly C to be swung rearward (counterclockwise) by the coins as the chute assembly C moves rearward from its forward retracted position in which it appears in FIG. 4. Chute assembly C is identical to that indicated at 325 in the aforesaid U.S. Patent 2,823,782 and similar to that indicated at 155 in U.S. Patent 2,858,921. Full details of the sliding coin chute assembly C may be ascertained from U.S. Patent 2,823,782 and will not be repeated here. It will suffice here to say that the sliding coin chute assembly C has a quarter chute 339, a dime chute 349 and a nickel chute 357 (see FIG. 2). It is slidable horizontally rearward from its forward retracted position and back to retracted position on pulling out and returning any rod R. This is accomplished in the present instance by providing a crank 377 (the same as in U.S. Patent 2,823,782) on the outer end of shaft 49, and a link 379 connecting the crank and the chute assembly C (see FIG. 4). A quarter entering the quarter chute comes to rest on a quarter support 381 (see FIG. 12) behind pins 383 in assembly C in position for engaging arm 133 which extends through an opening in assembly C. A dime entering the dime chute comes to reset on a dime support 405 in position behind deflector 387 in assembly C for engaging arm 147 which extends through an opening in assembly C. A first nickel entering the nickel chute comes to rest on a nickel support 411 in position behind the lower arm of toggle 425 in assembly C for engaging arm 169 which extends through an opening in assembly C. A second nickel entering the nickel chute comes to rest on the first nickel in position behind the upper arm of toggle 425 in assembly C for engaging arm 167 which extends through an opening in the assembly C. Supports 381, 405 and 411 are identical to those shown in U.S. Patent 2,823,782 on plate 525 adapted to be moved rearward by coin return bar 459 in the same manner as described in said U.S. patent. Toggle 425 in assembly C is controlled by a lever 461 pivoted on the outside of assembly C. By referring to U.S. Patent 2,823,782, it will be understood that if there is only one nickel on nickel support 411, this nickel will be ineffective to swing arm 169 on rearward movement of assembly C unless toggle 425 is locked by lever 461. If there are two nickels on support 411, one above the other, these nickels act to lock the toggle 425 so that arms 169 and 167 are swung counterclockwise as viewed from above by the nickels on rearward movement of assembly C.

The sliding coin chute assembly C carries a bracket B (see FIGS. 2 and 4) extending forward adjacent the lower front corner of assembly C. This bracket carries a horizontal lug H which has an inclined cam edge E adapted under circumstances in which a nickel is to be issued in change, as will be made clear, to engage under finger 275 at the upper end of bar 263 and to raise the bar 263. Under circumstances in which a nickel is not to be issued in change, lug H simply passes over the finger 275.

It will be understood that the vending machine will have a coin slot for nickels, dimes and quarters. Coins deposited in this slot will enter a coin selector and slug rejector (not shown) for delivering a nickel to the nickel chute 357 of the coin receiver 325, for delivering a dime to the dime chute 349 of the receiver, and for delivering a quarter to the quarter chute 339 of the receiver when the receiver is in its retracted position shown in FIG. 4. Brackets for mounting the coin selector and slug rejector device are indicated at 583 and 585. The coin selector and slug rejector device rejects coins of improper denominations and spurious coins. Such rejected coins drop out of the device into the upper end of a chute 218. Coin selector and slug rejector devices suitable for the purpose are known; see, for example, U.S. Patent 2,292,628.

A chute-type primary nickel magazine 300 (see FIGS. 1, 4, 13 and 17) is mounted on the outside of plate 43. The sliding chute assembly C slides back and forth above this magazine, which comprises an assembly of an inside plate 302, an outside plate 304 and spacers 306a–306g (see FIG. 13) between these plates. The spacers are shaped and positioned to provide a zigzag nickel chute 308 having an upper inlet 308a toward the upper rear corner of magazine 300, an upper section 308b inclined forward and downward from the inlet, an intermediate section 308c inclined rearward and downward from the forward end of section 308b, and a lower section 308d inclined forward and downward from the rearward end of section 308c. The inside plate 302 has horizontal slots 310 at its upper end which receive studs 361 (the same as studs 361 shown in U.S. Patent 2,823,782) on the sliding chute assembly C to mount the assembly C for sliding movement above the magazine 300. As the sliding coin chute assembly C reaches the rearward end of its stroke, a nickel or two nickels therein are carried off the nickel support 411 and drop out of assembly C into the inlet 308a of magazine 300. A dime or a quarter in assembly C drops through a chute 312 (see FIGS. 15 and 16) on the inside of plate 302 to a money box (not shown).

Nickels dropping down into the inlet 308a of the zigzag nickel chute 308 from sliding chute assembly C roll down chute 308 and may accumulate therein up to a certain point, as will be made clear. Means is provided to determine when the supply of nickels in chute 308 becomes depleted. This means comprises a lever 314 (see FIGS. 4 and 17) pivoted at 316 on the outside of magazine 300, having a finger 318 extending through a slot 320 in magazine 300 adjacent the rearward end of the lower chute section 308d. Lever 314 is biased to rotate in counterclockwise direction as viewed in FIG. 4 to the position illustrated in FIG. 4 wherein finger 318 extends across chute 308 in position to block coins from rolling down chute section 308d. If there are sufficient nickels in the chute 308 to extend from the lower end of the chute up chute section 308d to the slot 320, finger 318 will engage the nickel at the slot and will thereby be held in the raised retracted position in which it is illustrated in FIG. 17. Lever 314 has an upwardly extending arm 322 interconnected by a link 324 to a pin 326 extending from the lower end of lever 253 through a slot 328 in magazine 300. The arrangement is such that when lever 314 is held in retracted position by engagement of finger 318 with a nickel in chute 308, lever 253 is held in a retracted position permitting dog 241 to assume its retracted position. Accordingly, as long as the chute 308 contains nickels up to slot 320, upward movement of bar 227 is ineffective to release latch L2 for movement toward its operative position. However, if the supply of nickels in chute 308 should become depleted below slot 320, lever 314 will swing counterclockwise from its FIG. 17 position, and move lever 253 to its operative position to hold dog 241 in its operative position. Then, bar 227 is effective whenever it is moved upward to rock lever 187 clockwise to release latch L2 for movement toward its operative position.

Lever 314 has a rearwardly extending arm 332 the lower edge of which is engageable by a lever 334 (see FIG. 23) pivoted at 336 on a rear flange of main plate 43. A wire 338 extends up from lever 334 to a lever 340 (see FIG. 22) pivoted at 342 on the rear flange of the main plate 43. An interceptor 344 pivoted at 346 on the outside of the right side wall has a connection at 348 with lever 340. Interceptor 344 has a coin-intercepting finger 350 operable in the coin selector and slug rejector (not shown) adapted when it swings out from plate 43 to enter a hole in the coin selector and slug rejector and intercept a quarter deposited in the machine and expel it into the aforesaid chute 218 for return to the customer. A spring 352 biases levers 340 and 334 to swing upward. If the supply of nickels in chute 308 should become depleted below slot 320, lever 314 swings counterclockwise from its FIG. 17 position and arm 332 swings upward, thereby releasing lever 334 to swing upward to allow interceptor 344 to swing to its quarter-intercepting position. Lever 314 has an outwardly extending latch pin 354 (see FIGS. 4 and 17) at its forward end. This is engageable by a shoulder 356 at the upper end of a latch lever 358 pivoted at 360 on the outside of the nickel magazine 300. Latch lever 358 is biased to swing clockwise toward the pin 354 by a spring 362. It has a roller 364 at its lower end engageable by a finger 366 on a lever 368 rotary on a shaft 370 journalled in a gear housing 372 mounted on the main plate 43 below magazine 300. A ratchet 374 (see FIG. 17) fixed on shaft 370 is engageable by a driving pawl 376 carried by lever 368. Lever 368 is biased to swing clockwise, which is the direction for driving the ratchet via the pawl 376, by a spring 378. Shaft 370, via speed-increasing gearing 380 in housing 372, drives a shaft 382 carrying a vane 384. Lever 368 is adapted to be swung counterclockwise against the return bias of spring 378 by a linkage driven by the sliding coin chute assembly C on rearward movement thereof, this linkage comprising levers 386 and 388 and a link 390. Lever 386 is pivoted at 392 on the outside of magazine 300 and has a pin 394 at its upper end engageable by the rear edge of sliding chute assembly C. It is biased by a spring 396 to swing counterclockwise, which is the direction for engagement of pin 394 with the rear edge of assembly C. Lever 388 is pivoted at 398 on the outside of magazine 300 and has a pin 400 at its upper end engageable by lever 386. Lever 388 is biased by a spring 402 to swing counterclockwise. Link 390 is pin-connected at one end as indicated at 404 to the lower end of lever 388, and has a slot 406 at its other end receiving a stud 408 on lever 368.

Whenever chute assembly C moves rearward, levers 386 and 388 are swung clockwise and link 390 is driven forward, thereby to swing lever 368 counterclockwise. This releases the latch lever 358 for movement toward latching position under the bias of spring 362. Pawl 376 clicks back over the ratchet. Then when chute assembly C is returned forward, levers 386 and 388 return to their initial position, but lever 368 is delayed in returning to initial position by the action of the pawl and ratchet mechanism and the vane 384. This delay is caused by pawl 376 driving the ratchet 374 clockwise, and the rotation of the ratchet being braked by the vane.

Lever 386 controls a mechanism for diverting nickels from magazine 300 whenever it may be filled with nickels up to the rearward end of the upper magazine section 308b. This mechanism comprises a gate 410 (see FIGS. 4, 15 and 16) pivoted at 410p on the outside of magazine 300 and having a lower flange 412. A spring 414 biases the gate toward a closed position wherein flange 412 extends through a slot 416 in magazine 300, this flange then constituting the bottom of the rearward end portion of the upper magazine section 308b. An angled guide 420 which extends thruogh an opening 422 in magazine 300 below slot 416 directs nickels which fall below slot 416 when gate 410 is open into chute 312, which directs the coins to the money box. A lever 424 is pivoted at 426 on an ear 428 which extends out from the gate. Lever 424 has a finger 430 at its forward end adapted to feel into a hole 432 in magazine 300. Lever 424 has a lug 434 at its rearward end engageable by a cam edge 436 on lever 386. When lever 386 is swung clockwise from its initial position, cam edge 436 thereon swings lever 424 clockwise as viewed from above and tends to swing finger 430 into the hole 432. If magazine 300 is not filled with nickels up to the hole 432, the lever 424 simply swings clockwise and gate 410 remains closed. However, if magazine 300 is filled with nickels up to hole 432, finger 430 is blocked from swinging through hole 432 by the nickel at the hole, and then swinging of lever 386 is effective to swing the gate open. Any nickel entering inlet 308a then drops straight down in magazine 300 to guide 420 and is deflected thereby into chute 312. Spring 396 is connected between levers 386 and 424 to bias the latter to swing counterclockwise as viewed from above, i.e., to bias finger 430 out of hole 432.

The bottom edge of the magazine 300 is cut away at the front of the magazine as indicated at 438 in FIGS. 4, 13, 17 and 18 to accommodate a gate 440 which is referred to as the dime change gate and a gate 442 which is referred to as the quarter change gate. These gates are pivoted side-by-side on a rod 444 mounted on the inside of magazine 300. The dime change gate has a lower flange 446 having a width corresponding to the diameter of a nickel and the quarter change gate has a lower flange 448 having a width three times the diameter of a nickel. When the gates are closed, these flanges reach under the forward end portion of lower magazine chute section 308d and constitute the bottom thereof. The gates are biased closed by leaf springs 450 and 452. The dime change gate 440 is at the forward end of the lower chute section 308d and the quarter change gate 442 is immediately rearward of the dime change gate. The latter has a forward finger 454 which reaches through a slot 456 in magazine 300 and which constitutes a stop for nickels rolling down chute section 308d. The arrangement is such that the lowermost nickel in magazine 300 rests on flange 446 of gate 440 and against finger 454, and the next three nickels rest on flange 448 of gate 442. When gate 440 opens (i.e., when it is swung counterclockwise as viewed in FIG. 20 which is clockwise as viewed from the front of the machine) to withdraw its flange 446 from under chute section 308d, the nickel which was supported on flange 446 drops down and rolls out to the customer through a chute 458. When gate 440 is open, nickels are prevented from rolling forward off flange 448 by a lug 460 on gate 440. When gate 440 returns to closed position, a nickel can then roll down onto flange 446 through a notch 462 in lug 460, and an additional nickel comes onto flange 448 to take the place thereof. When gate 442 opens (i.e., when it is swung counterclockwise as viewed in FIG. 19) to withdraw its flange 448 from under chute section 308d, the three nickels which were supported on flange 448 drop down into chute 458 and roll out. When gate 442 is open, nickels are prevented from rolling out by a lug 464 on gate 442. When gate 442 returns to closed position, nickels can then roll down onto flange 448 through a notch 466 in lug 464. Thus, when gate 440 is opened, one nickel is dispensed in change, and when gate 442 is opened, three nickels are dispensed in change. When both gates are opened, four nickels are dispensed in change.

Levers 468 and 470 (see FIG. 5) are pivoted at 472 on the outside of main plate 43. Lever 468 has a cam edge 474 engageable by a roller 476 extending from the lower end of the control lever 59 through an arcuate slot 478 in plate 43. Lever 468 has a stud 480 engageable by lever 470 and a spring 482 interconnected between stud 480 and lever 470 biases the latter toward engagement with the stud. A spring 484 (weaker than spring 482) acts to bias levers 470 and 468 to swing clockwise and maintains lever 468 in engagement with roller 476. A bar 486 (see FIGS. 5 and 21) has one end pin-connected as indicated at 488 to the lower end of lever 470 and extends forward therefrom, its forward end being supported by a stud 490 extending through an elongate slot 492 therein. The arrangement is such that whenever a rod R is pulled outward and the control lever 59 is thereby swung counterclockwise as viewed from inside and clockwise as viewed from the outside, roller 476 swings lever 468 downward on pivot 472 and lever 468, acting through spring 482, swings lever 470 counterclockwise, thereby sliding bar 486 rearward. Then when the control lever 59 returns to its initial position, spring 484 returns levers 468 and 470 and bar 486 to their initial position.

A bellcrank lever 496 for operating the dime changer gate 440 and a bellcrank lever 498 for operating the quarter change gate 442 are pivoted at 500 and 502, respectively, on plate 43 (see FIGS. 5 and 21). Lever 496 has a pin 504 engageable with an arm 506 on gate 440 and lever 498 has a pin 508 engageable with an arm 510 on gate 442. Levers 496 and 498 are biased counterclockwise by springs 512 and 514 to retracted positions (see FIG. 5) against stops 516 and 518. When lever 496 is swung clockwise from its retracted position, pin 504 thereon opens gate 440. When lever 498 is swung clockwise from its retracted position, pin 508 thereon opens gate 442. Lever 496 is adapted to be swung clockwise by a lever 520 pivoted at 522 on bar 486. Lever 520 has a lug 524 at its forward end and is biased by a spring 526 to a retracted position wherein lug 524 is raised clear of the upper end of lever 496 (see FIG. 5). Lever 520 has a roller 528 at its rearward end engageable by a finger 530 at the lower end of bar 263. When bar 263 moves upward, lever 520 is swung counterclockwise to bring lug 524 in front of the upper end of lever 496 (see FIG. 21). Then, on rearward movement of bar 486, dime changer gate 440 is opened.

Lever 498 is adapted to be swung clockwise by a lever 532 pivoted at 534 on bar 486. Lever 532 has a lug 536 at its forward end and is biased by a spring 538 to a retracted position wherein lug 536 is raised clear of the upper end of lever 498 (see FIG. 5). Lever 532 has a roller 540 at its rearward end engageable with an ear 542 on a lever 544 pivoted at 546 on side wall 3. A lever 548 (see FIG. 3) is pivoted at 550 on the inside of plate 43, and is engageable by the previously mentioned arm 137 on quarter lever 131. A spring 552 acts on arm 137 to hold it against lever 548. Lever 548 has a pin 554 reaching out through an opening 556 in plate 43, and a wire 558 (see FIG. 5) connects pin 554 and lever 544. A spring 560 biases pin 554 upward, and acts through the wire to bias lever 544 upward. However, the wire and lever 544 are normally maintained in a lowered position against the upward bias of spring 560 by the action of arm 137 on lever 548. When the quarter lever 13 is swung rearward, arm 137 swings forward to release lever 548 to swing counterclockwise as viewed from the inside. Spring 560 thereupon acts to pull up the wire 558 and swing up the lever 544. The latter then swings lever 532 counterclockwise to bring lug 536 down in front of the upper end of lever 498 (see FIG. 21). Then, on rearward movement of the bar 486, quarter change gate 442 is opened. Bar 486 carries a pin 561 engageable with the lower end of lever 253 to swing lever 253 counterclockwise on rearward movement of bar 486.

A bracket 562 (see FIGS. 1–3 and 14) is mounted on the main plate 43 at the front thereof. This bracket includes a top plate 564 on top of which is mounted a block 566 having an upwardly extending tubular boss 568 which constitutes a socket for a vertical tube 570 adapted to hold a stack of nickels stacked flatwise one on top of another. Block 566 is formed to serve as a guide for a nickel pusher slide 572 which is slidable rearward and forward on top of plate 564. Slide 572 normally occupies a retracted position wherein its rearward end is forward of tube 570, and the stack of nickels then bears on plate 564. When slide 572 moves rearward, it pushes the lowermost nickel of the stack rearward to an opening 574 in plate 564, and the nickel drops through opening 574 and down into a chute 576 mounted underneath plate 564 with its upper end in register with opening 574. This chute 576 has an inclined side wall 578 engageable by a nickel dropping flatwise through the opening to tilt the nickel. The nickel drops out of the lower end of the chute into magazine 300, which has a lip 580 (see FIG. 13) on the upper edge of plate 302 to guide the nickel thereinto and the nickel falls down in a passage 582 in magazine 300 to the forward (upper) end of the intermediate chute section 308c.

Slide 572 has studs 584 extending out from opposite sides thereof received in slots 586 in the upper ends of a pair of arms 588 pivoted at 590 on a bottom plate 592 of the bracket 562. A pin 594 extends toward the left from the left arm 588 and is adapted for engagement in a notch 596 in a bar 598 which extends forward from the control lever 59, this bar having its rearward end pin-connected as indicated at 600 to the control lever. The position of bar 598 is controlled by a feeler lever 602 (see FIG. 1) which feels out the status of the nickel supply in magazine 300. Lever 602 is pivoted at 604 on the bottom of bracket 562. It has a finger 606 adapted to reach into a hole 608 in magazine 300 at the forward (upper) end of intermediate chute section 308c, and is connected by a link 610 to bar 598. When finger 606 is held out by a nickel, lever 602 acts through link 610 to hold bar 598 up and clear of pin 594. However, when the supply of nickels in magazine 300 is depleted to the point where the last nickel is below hole 608, finger 606 swings in and bar 598 is lowered to a position wherein pin 594 is caught in the notch 596. Then, when bar 598 is dragged rearward on operation of the control lever, slide 572 is moved rearward to eject a nickel from the stack in the tube for replenishing the supply in magazine 300.

To facilitate servicing, means is provided for holding both latches L1 and L2 retracted and for blocking out change-making operations. This means comprises a bar 612 horizontally slidable on the inside of plate 43 having its rearward end connected by means of a pin 614 extending through a slot in plate 43 with the upper end of lever 616 pivoted at 618 on the outside of plate 43. Lever 618 has a cam 620 at its lower end engageable with edge portion 135 of lever 131 to swing lever 131 counterclockwise as viewed from above when bar 612 is pulled out to rock lever 616 counterclockwise from its FIG. 5 position. Bar 612 has a lug 622 which, when the bar 612 is pulled forward, is engageable by lever 548 (see FIG. 3) to keep it from rocking counterclockwise. This blocks out operation of the quarter change gate 442. Lever 618 carries a pin 624 (see FIG. 5) engageable with an upward extension 626 of lever 271 when bar 612 is pulled forward. This blocks out operation of the lever 271 such as would effect operation of the dime change gate 440. Bar 612, when in forward position, is engageable by the door of the cabinet (not shown) in which the apparatus is housed automatically to be returned rearward when the door is closed.

Operation is as follows:

Assuming that either a five-cent or a ten-cent selector rod R is pulled out without deposit of any coins in the machine, it can be pulled out only a limited distance until shoulder 105 on control lever 59 strikes latch L1. Here it will be understood that when any rod R is pulled out, draw bar 13 is moved forward and acts through link 60 to swing lever 59 counterclockwise as viewed in FIG. 3. This limited movement of the rod R is insufficient to accomplish dispensing.

Assuming that a nickel is deposited for buying a five-cent item, the nickel is delivered to the nickel chute 357 in sliding chute assembly C, coming to rest on nickel support 411. When the five-cent (left-hand) rod R is pulled out, and bar 227 is raised as above described, the finger 259 at the upper end of bar 227 is raised to a position wherein it is engageable with the outer end of lever 461 on sliding chute C to keep the toggle 425 in sliding chute C locked. As control lever 59 is rotated counterclockwise from its retracted position as viewed in FIG. 3, shaft 49 is rotated clockwise as viewed in FIG. 4 and acts through crank 377 and link 379 to move the sliding chute C rearward, i.e., to the right as viewed in FIG. 4. With toggle 425 locked as described, the nickel moves rearward with sliding chute C and acts against arm 169 to swing lever 163 counterclockwise as viewed from above. Finger 181 on lever 163 engages lever 143 to swing latch L1 to retracted position. Assuming that there are nickels in chute 308 up to slot 320, latch L2 stays in retracted position, since dog 241 is then in retracted position and ineffective to operate lever 187 on upward movement of bar 227. With both latches L1 and L2 retracted, full-stroke operation of the five-cent rod R is permitted for dispensing a five-cent item.

Even if the supply of nickels in chute 308 should be depleted below slot 320, it is still possible to obtain a five-cent item on deposit of a nickel and pulling out a five-cent rod R. Under these circumstances, dog 241 occupies its operative position and engages ear 247 on bar 195 to drive bar 195 upward when the five-cent rod is pulled out. Here it will be understood that when a five-cent rod is pulled out, roller 219 carried by the head 33 at the inner end of the rod engages the respective arm 217 on price shaft 205 and rocks this shaft clockwise as viewed in FIGS. 2A and 3, counterclockwise as viewed in FIG. 5. Crank arm 207 on the end of the price shaft 205 thereupon swings cam 213 clockwise as viewed in FIG. 5 to raise the bar 227. As the bar 227 moves upward, dog 241 thereon, being in operative position, engages ear 247 on bar 195 to drive the latter upward. Bar 195 swings lever 187 clockwise from its FIG. 5 to its FIG. 12 position, with resultant movement of cam 189 on lever 187 in such direction as to free latch L2 for movement under the bias of spring 177 to its operative position. However, finger 181 on lever 163 engages finger 179 on latch L2 to swing latch L2 to retracted position before it can swing into operative position. Accordingly, latch L2 being retracted, and latch L1 being retracted in the same manner as described in the preceding paragraph, full-stroke operation of the five-cent rod R is permitted for dispensing a five-cent item.

Assuming that a nickel is deposited, and the ten-cent rod R pulled, bar 227 is not raised. Accordingly, toggle 425 is not locked, and the nickel is ineffective to release latch L1 before shoulder 165 on control lever 59 engages latch L2. The customer may then buy a five-cent item, or deposit another nickel and buy a ten-cent item.

Assuming that a dime is deposited for buying a ten-cent item, the dime is delivered to the dime chute 349 in sliding chute C, coming to rest on dime support 405. When the ten-cent (right-hand) rod R is pulled out, sliding chute C moves rearward and the dime moves rearward with sliding chute C and acts against arm 147 to swing lever 141 counterclockwise as viewed from above. Lever 141 acts against finger 161 on lever 143 to swing the latter and the latch L1 counterclockwise as viewed from above, thereby to retract latch L1. Latch L2 remains in its initial retracted position since bar 227 is not raised when the ten-cent rod R is pulled out, whether or not there are nickels up to slot 320 in chute 308. Accordingly, full-stroke operation of the ten-cent rod R is permitted for dispensing a ten-cent item.

Assuming that two nickels are deposited for buying a ten-cent item, these nickels are delivered to the nickel chute 357 in sliding chute assembly C, the first coming to rest on nickel support 411 and the second coming to rest on the first. When the ten-cent (right-hand) rod R is pulled out, sliding chute C moves rearward and the nickels move rearward therewith and act against arms 169 and 167 to swing lever 163 counterclockwise. Finger 181 on lever 163 engages lever 143 to swing latch L1 to retracted position. Latch L2 remains in its initial retracted position since bar 227 is not raised when the ten-cent rod is pulled out, whether or not these are nickels up to slot 320 in chute 308. Accordingly, full-stroke operation of the ten-cent rod is permitted for dispensing a ten-cent item.

Assuming that a dime is deposited for buying a five-cent item, the dime is delivered to the dime chute 349 in sliding chute C, coming to rest on dime support 405. When the five-cent (left-hand) rod R is pulled out, bar 227 is moved upward and sliding chute C is moved rearward. Assuming that there are nickels in chute 308 up to slot 320, dog 241 is retracted and raising of bar 227 has no effect on latch L2, which remains in retracted position. The dime moves rearward with the sliding chute C and engages arm 147 to swing lever 141 counterclockwise as viewed from above. Lever 141 engages finger 161 on lever 143 and releases latch L1. Accordingly, full-stroke operation of the five-cent rod is permitted for dispensing a five-cent item. Additionally, a nickel is dispensed in change from chute 308 as follows: As the dime, moving rearward with the sliding chute C, swings arm 147 counterclockwise as viewed from above, and as bar 227 is moved upward, lever 271 is permitted to rock clockwise under the bias of spring 285 to the point where the bottom of hole 277 in arm 273 of lever 271 engages finger 279 at the upper end of bar 263. This brings finger 275 on lever 271 into position for actuation by cam edge E (see FIGS. 2 and 4) of lug H on bracket B carried by the sliding chute C, with the result that as the sliding chute C moves rearward, cam edge E engages the finger 275 and swings the lever 271 further clockwise to lift the bar 263. Finger 530 at the lower end of bar 263 then swings lever 520 (compare FIGS. 5 and 21) to bring lug 524 in front of the upper end of lever 496. Bar 486 (which carries lever 520) is moved rearward by the action of roller 476 carried by control lever 59 on cam edge 474 of lever 468. As bar 486 moves rearward, lug 524 on lever 520 (moving with bar 486) engages the upper end of lever 496 and rocks lever 496 clockwise (compare FIGS. 5 and 21). Pin 504 on lever 496 thereupon opens the dime change gate 440, thereby dispensing the nickel which was supported on flange 446 of this gate to the customer.

The nickels in chute 308 below slots 320 roll down freely toward the lower end of lower chute section 308d. Finger 318 on feeler lever 314, which would normally hold back all nickels above slot 320, is retracted by the action of pin 561 on lever 253 as bar 486 moves rearward. In this respect, pin 561 swings lever 253 counterclockwise. This effects movement of link 324 to the right as viewed in FIG. 17 to swing lever 314 clockwise, thereby raising finger 318 to allow the nickels above slot 320 to roll down. Finger 318 becomes latched in this raised position by the action of latch lever 358 which swings in to bring its shoulder 356 under pin 354 on lever 314. Rearward movement of sliding chute C results in counterclockwise swing of lever 368 away from its FIG. 17 position via swinging of levers 386 and 388 with resultant pushing to the left of link 390. On forward return of the sliding chute C, link 390 is dragged back to its FIG. 17 position, and lever 368 is returned by spring 378 relatively slowly due to the effect of the retarding mechanism comprising pawl 376 on lever 368, ratchet 374, gearing 380 and vane 384. When lever 368 completes its return, finger 366 thereon engages pin 364 on latch lever 358 and releases the latter so that finger 318 may return downward. The delay in the return of finger 318 insures that nickels will have ample time to roll down, even though the rod R be given a fast pull.

Assuming that the supply of nickels in chute 308 is depleted below slot 320, and a dime is deposited for buying a five-cent item (meaning that a nickel in change is required), the five-cent rod R will be locked against full-stroke operation by latch L2. Under these circumstances, dog 241 occupies its operative position, which means that latch L2 is freed to swing into operative position when the five-cent rod R is pulled out. The dime is effective only to take out latch L1, but does not take out latch L2. The customer may then obtain return of his dime by operating the coin return bar 549.

Assuming that a quarter is deposited for buying a ten-cent item, the quarter is delivered to the quarter chute 339 in sliding chute C, coming to rest on quarter support 381. When the ten-cent rod R is pulled out, sliding chute C is moved rearward (but bar 227 is not moved upward). The quarter moves rearward with sliding chute C and engages arm 133 to swing lever 131 counterclockwise as viewed from above. Lever 131 being fastened to rod 115, the latter is rotated counterclockwise. Screw 183 on rod 115 swings lever 141 counterclockwise and finger 161 on lever 141 swings lever 143 counterclockwise to take out latch L1. Latch L2 remains in retracted position. Accordingly, full-stroke operation of the ten-cent rod is permitted for dispensing a ten-cent item. Additionally, three nickels are dispensed in change from chute 308 as follows: As lever 131 is swung counterclockwise by the quarter, arm 137 on lever 131 swings forward to release lever 548 to swing counterclockwise as viewed in FIG. 3. Spring 569 pulls wire 558 (see FIG. 5) upward to rock lever 544 clockwise. Lever 544 rocks lever 532 on bar 486 counterclockwise to bring lug 536 of lever 532 down in front of the upper end of lever 498 (compare FIGS. 5 and 21). Bar 486 (which carries lever 532) is moved rearward by the action of roller 476 carried by control lever 59 on cam edge 474 of lever 468. As bar 486 moves rearward, lug 536 on lever 532 (moving with bar 486) engages the upper end of lever 498 and rocks lever 498 clockwise (compare FIGS. 5 and 21). Pin 508 on lever 498 thereupon opens the quarter change gate 442, thereby dispensing the three nickels which were supported on flange 448 of this gate to the customer.

Assuming that a quarter is deposited for buying a five-cent item, the quarter is delivered to the quarter chute 339 in sliding chute C, coming to rest on quarter support 381. When the five-cent rod R is pulled out, bar 227 is moved upward and sliding chute C is moved rearward. Assuming that there are nickels in chute 308 up to slot 320, raising of bar 227 has no effect on latch L2, which remains in retracted position. The quarter moves rearward with the sliding chute C and engages arm 133 to swing lever 131 counterclockwise as viewed from above thereby to take out latch L1 the same as above described on deposit of a quarter and pulling out the ten-cent rod. Accordingly, full stroke operation of the five-cent rod is permitted for dispensing a five-cent item. Additionally, four nickels are dispensed in change from chute 308 as follows: When lever 141 and arm 147 thereon swing counterclockwise, lever 271 rocks clockwise the same as when a dime is deposited and a five-cent rod pulled (noting that bar 227 is moved upward). Gate 440 is opened in the same manner as above described as when a dime is deposited and the five-cent rod pulled to dispense one nickel. Gate 442 is opened in the same manner as above described as when a quarter is deposited and the ten-cent rod pulled to dispense three nickels.

When the supply of nickels in chute 308 is depleted below slot 320, feeler lever 314 swings to its FIG. 5 position, and arm 332 on lever 314 swings up to release lever 334 and wire 338 to allow interceptor 344 to swing to quarter intercepting position in relation to the coin selector and slug rejector (not shown). Accordingly, any quarter deposited under these circumstances is intercepted in the coin selector and slug rejector and returned to the customer via chute 218.

From the above it will be apparent that the apparatus is operable to dispense a five-cent item on deposit of a nickel, dime or quarter and operation of a five-cent rod R, and to dispense a ten-cent item on deposit of a dime, two nickels or a quarter and operation of a ten-cent rod R. On deposit of a dime and operation of a five-cent rod, it issues a nickel in change. On deposit of a quarter and operation of a ten-cent rod, it issues three nickels in change. On deposit of a quarter and operation of a five-cent rod, it issues four nickels in change. If the supply of nickels in the nickel magazine 300 should be depleted, the apparatus cannot be operated by any combination requiring change (i.e., deposit of a dime to obtain a five-cent item, or deposit of a quarter to obtain a five-cent or ten-cent item). However, even though the apparatus cannot be operated for such combinations when the supply of nickels in magazine 300 is depleted, it remains operable for any combination not requiring change (i.e., deposit of a nickel to obtain a nickel item, deposit of a dime or two nickels to obtain a ten-cent item).

Quarters and dimes drop out of sliding chute C into chute 312 on rearward movement of chute C for delivery to a money box. Nickels drop out of sliding chute C into magazine 300 until the latter is full up to hole 432 for feeler finger 430, and then are diverted into chute 312 for delivery to the money box. Whenever the supply of nickels in magazine 300 drops below hole 608, a nickel is dispensed from vertical tube 570 into magazine 300 on each operation of the apparatus until the supply is replenished up to hole 608. Thus, when the supply of nickels is depleted to the point where the last nickel is below hole 608, finger 606 on lever 602 swings into the hole, and bar 598 is lowered to engage pin 594 in notch 596. Then, each time a rod R is pulled out and returned, bar 598 is actuated to operate the slide 572 for ejecting a nickel from the tube 570.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A vending machine having a first selector operable to obtain an item of a first price and a second selector operable to obtain an item of a second price which is a whole multiple of the first price, said first selector being adapted for operation on deposit of a first coin having a value corresponding to said first price, or a second coin having a value corresponding to the second price, or a third coin having a value which is a higher whole multiple of said first price, said second selector being operable on deposit of a second or a third coin, means for holding a supply of said first coins for being dispensed in change, a first mechanism for dispensing a number of coins from said supply corresponding to the difference between the second and the first price, a second mechanism for dispensing a number of coins from said supply corresponding to the difference between the value of a third coin and said second price, means responsive to deposit of a second coin in the machine and operation of the first selector for actuating said first mechanism, means responsive to deposit of a third coin in the machine and operation of the second selector for actuating said second mechanism, and means responsive to deposit of a third coin in the machine and operation of the first selector for actuating both mechanisms.

2. A vending machine having first and second selectors operable to obtain five-cent and ten-cent items, respectively, means for holding a supply of nickels for being dispensed in change, a first mechanism for dispensing one nickel from said supply, a second mechanism for dispensing three nickels from said supply, means responsive to deposit of a dime in the machine and operation of a five-cent selector for actuating said first mechanism, means responsive to deposit of a quarter and operation of a ten-cent selector for actuating said second mechanism, and means responsive to deposit of a quarter and operation of a five-cent selector for actuating both mechanisms.

3. A vending machine having a first selector operable to obtain an item of a first price and a second selector operable to obtain an item of a second price which is a whole multiple of the first price, a latch normally occupying an operative position for locking out the selectors, means for retracting said latch in response to deposit of a first coin having a value corresponding to said first price, or a second coin having a value corresponding to the second price, or a third coin having a value which is a higher whole multiple of said first price, and operation of the first selector, and for retracting said latch in response to deposit of a second or a third coin and operation of the second selector, means for holding a supply of said first coins for being dispensed in change, a first mechanism for dispensing a number of coins from said supply corresponding to the difference between the second and the first price, a second mechanism for dispensing a number of coins from said supply corresponding to the difference between the value of a third coin and said second price, means responsive to deposit of a second coin in the machine and operation of the first selector for actuating said first mechanism, means responsive to deposit of a third coin in the machine and operation of the second selector for actuating said second mechanism, and means responsive to deposit of a third coin in the machine and operation of the first selector for actuating both mechanisms.

4. A vending machine having first and second selectors operable to obtain five-cent and ten-cent items, respectively, a latch normally occupying an operative position for locking out the selectors, means for retracting the latch in response to deposit of a nickel, dime or quarter and operation of a five-cent selector and for retracting the latch in response to deposit of two nickels, a dime or a quarter and operation of a ten-cent selector, means for holding a supply of nickels for being dispensed in change, a first mechanism for dispensing one nickel from said supply, a second mechanism for dispensing three nickels from said supply, means responsive to deposit of a dime and operation of a five-cent selector for actuating said first mechanism, means responsive to deposit of a quarter and operation of a ten-cent selector for actuating said second mechanism, and means responsive to deposit of a quarter and operation of a five-cent selector for actuating both mechanisms.

5. A vending machine as set forth in claim 4 having a second latch for said selectors normally occupying a retracted position and movable to operative position locking out said ten-cent selector in response to depletion of the supply of nickels and operation of the five-cent selector.

6. A vending machine as set forth in claim 4 in which nickels deposited in the machine are fed into said supply means until it is filled to a predetermined point, and having means for then diverting nickels to a money box, means for holding an auxiliary supply of nickels, and means for dispensing nickels from said auxiliary supply into the first-mentioned supply means in response to depletion of the supply in the first-mentioned supply means and operation of any selector.

7. A vending machine having a plurality of manually operable selectors, a control lever movable in response to operation of any selector, a primary magazine for holding a supply of coins to be dispensed in change, an auxiliary magazine for holding a reserve supply of said coins, means adapted to dispense coins from said auxiliary magazine to said primary magazine, a bar connected to said control lever and connectable to said dispensing means, and a feeler controlling said bar, said feeler being normally held in a retracted position by engagement with a coin in the primary magazine as long as the supply of coins in the primary magazine is at least up to a predetermined level thereby to hold the bar in a retracted position disconnected from said dispensing means, said feeler being adapted to move away from retracted position upon depletion of coins below said level thereby to allow the bar to move into a position wherein it is connected to said dispensing means.

8. A coin dispenser comprising means defining a zigzag coin chute having an inclined lower section, first and second gates at the lower end of said lower section, each gate having a portion which, in a closed position of the gate, forms a bottom for said lower section of the chute, the chute-bottoming portion of the first gate being of such length along the length of said lower section that it is adapted to hold a single coin and the chute-bottoming portion of the second gate being of such length along the length of said lower section that it is adapted to hold a plurality of coins, said gates being independently movable to retract the chute-bottoming portions thereof from said lower section of the chute for dispensing of one coin on opening the first gate, said plurality of coins on opening the second gate, and said plurality of coins plus one coin on opening both gates.

9. A coin dispenser as set forth in claim 8 wherein each gate has means thereon for blocking coins from rolling down and out said lower section of the chute when the gate is opened, said means being adapted to allow coins to roll down onto the chute-bottoming portion of the gate when the gate returns to closed position.

References Cited in the file of this patent

UNITED STATES PATENTS

| 1,721,441 | Forney | July 16, 1929 |
| 2,377,413 | Fry | June 5, 1945 |

FOREIGN PATENTS

| 503,257 | Great Britain | Apr. 4, 1939 |